(12) United States Patent
Kuehnert et al.

(10) Patent No.: US 12,491,136 B2
(45) Date of Patent: Dec. 9, 2025

(54) CAPSULE FILLING MACHINE AND METHOD FOR OPERATING A CAPSULE FILLING MACHINE

(71) Applicant: Harro Hoefliger Verpackungsmaschinen GmbH, Allmersbach im Tal (DE)

(72) Inventors: Timo Kuehnert, Allmersbach im Tal (DE); Florian Huhnen, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 0 days.

(21) Appl. No.: 18/677,466

(22) Filed: May 29, 2024

(65) Prior Publication Data
US 2024/0398665 A1  Dec. 5, 2024

(30) Foreign Application Priority Data
Jun. 2, 2023 (EP) ..................................... 23177029

(51) Int. Cl.
*A61J 3/07* (2006.01)
*B65B 3/28* (2006.01)
(Continued)

(52) U.S. Cl.
CPC ................ *A61J 3/074* (2013.01); *B65B 3/28* (2013.01); *G01G 15/00* (2013.01); *G01G 17/00* (2013.01); *G01G 21/00* (2013.01); *A61J 2200/74* (2013.01)

(58) Field of Classification Search
CPC ...... A61J 3/074; A61J 2200/74; G01G 15/00; G01G 15/001; G01G 21/00; G01G 17/00; G01G 23/01; G01G 23/14
See application file for complete search history.

(56) References Cited

U.S. PATENT DOCUMENTS 3,656,518 A * 4/1972 Aronson ................... B65B 1/16
 141/81
3,756,402 A * 9/1973 Wagers, Jr. ............. A61J 3/074
 209/543
(Continued)

FOREIGN PATENT DOCUMENTS

DE            4437597 A1 * 4/1995 ............. G01G 23/01
DE   10 2009 028 372 A1   2/2011
WO   WO-2020230013 A1 * 11/2020 ............. B25J 19/02

*Primary Examiner* — Robert F Long
*Assistant Examiner* — Eduardo R Ferrero
(74) *Attorney, Agent, or Firm* — Walter Ottesen, P.A.

(57) ABSTRACT

The capsule filling machine includes a turntable with capsule segments, at least one insertion station and at least one filling station. The capsule filling machine further includes at least one test container and a container weighing station with a weighing cell for weighing the test container. In a regular operating mode, capsule lower parts are inserted into a respective capsule receptacle of a segment lower part in the insertion station, and a product is filled in a filling station. In a testing mode, a test container is placed on a capsule receptacle, after which the test container in the segment lower part is moved to the at least one filling station and filled there with the product. The filled test container is then moved to the container weighing station and weighed there via the weighing cell. A method is for operating such a capsule filling machine.

9 Claims, 5 Drawing Sheets

(51) Int. Cl.
*G01G 15/00* (2006.01)
*G01G 17/00* (2006.01)
*G01G 21/00* (2006.01)

(56) References Cited

U.S. PATENT DOCUMENTS

| | | | | |
|---|---|---|---|---|
| 3,757,943 A * | 9/1973 | Chae | G06V 20/66 | 209/912 |
| 3,800,399 A * | 4/1974 | Warrick | A61J 3/074 | 53/381.1 |
| 4,172,380 A * | 10/1979 | Ansaloni | A61J 3/074 | 73/864.33 |
| 4,230,195 A * | 10/1980 | Graffin | B67C 3/202 | 177/1 |
| 4,343,130 A * | 8/1982 | Facchini | A61J 3/074 | 53/272 |
| 4,964,262 A * | 10/1990 | Moser | A61J 3/074 | 53/506 |
| 5,014,798 A * | 5/1991 | Glynn | G01G 19/14 | 222/23 |
| 5,024,047 A * | 6/1991 | Leverett | B65B 1/34 | 209/912 |
| 5,042,685 A * | 8/1991 | Moulding, Jr. | A61J 7/0445 | 221/241 |
| 5,240,118 A * | 8/1993 | Mayer | B07B 13/04 | 198/380 |
| 5,474,092 A * | 12/1995 | Moser | B65B 7/2821 | 53/900 |
| 5,515,740 A * | 5/1996 | Gamberini | G01G 17/00 | 177/17 |
| 5,750,938 A * | 5/1998 | De Caris | G01G 23/01 | 177/83 |
| 5,796,051 A * | 8/1998 | Chiari | G01G 17/00 | 209/912 |
| 5,852,259 A * | 12/1998 | Yanase | G01G 17/00 | 177/145 |
| 6,114,636 A * | 9/2000 | Cane' | G01G 17/00 | 209/592 |
| 6,162,998 A * | 12/2000 | Wurst | G01G 17/00 | 221/277 |
| 6,367,228 B1 * | 4/2002 | Wurst | A61J 3/074 | 53/53 |
| 6,478,162 B1 * | 11/2002 | Yamamoto | G01G 15/00 | 209/919 |
| 8,875,749 B2 * | 11/2014 | Nufer | B65B 1/32 | 177/1 |
| 9,574,931 B2 * | 2/2017 | Moulder | G01G 15/006 | |
| 2003/0019797 A1 * | 1/2003 | Yamamoto | A61J 3/074 | 209/649 |
| 2004/0249591 A1 * | 12/2004 | Trebbi | G01N 22/00 | 702/81 |
| 2005/0007588 A1 * | 1/2005 | Tarozzi | B07C 5/365 | 356/337 |
| 2005/0154555 A1 * | 7/2005 | Mueller | G01G 9/005 | 702/173 |
| 2006/0137760 A1 * | 6/2006 | Dubois | B65B 1/32 | 141/1 |
| 2008/0128002 A1 * | 6/2008 | Jeffs | B07B 1/40 | 134/25.4 |
| 2008/0219803 A1 * | 9/2008 | Runft | A61J 3/074 | 414/800 |
| 2009/0014086 A1 * | 1/2009 | MacMichael | B65B 1/22 | 141/71 |
| 2010/0037985 A1 * | 2/2010 | Waters | B65B 3/06 | 141/83 |
| 2010/0164144 A1 * | 7/2010 | Kuhnle | A61J 3/074 | 425/139 |
| 2011/0179859 A1 * | 7/2011 | Hemmings | G01G 17/00 | 73/149 |
| 2012/0207272 A1 * | 8/2012 | Runft | B65B 3/003 | 378/57 |
| 2013/0129041 A1 * | 5/2013 | Runft | G01N 23/083 | 378/56 |
| 2013/0206484 A1 * | 8/2013 | Consoli | A61J 3/074 | 177/1 |
| 2013/0216618 A1 * | 8/2013 | Muller | B29C 43/003 | 425/363 |
| 2013/0340882 A1 * | 12/2013 | Ehrbar | B67C 11/02 | 141/83 |
| 2014/0037061 A1 * | 2/2014 | Runft | G01N 23/16 | 378/62 |
| 2014/0326519 A1 * | 11/2014 | Moulder | G01G 15/006 | 177/145 |
| 2015/0204714 A1 * | 7/2015 | Boehringer | A61J 3/074 | 177/1 |
| 2016/0345778 A1 * | 12/2016 | Oddera | A47J 42/18 | |
| 2018/0168935 A1 * | 6/2018 | Chen | B65B 5/103 | |
| 2019/0008781 A1 * | 1/2019 | Puckett | A61J 3/07 | |
| 2019/0162582 A1 * | 5/2019 | Wurst | G01G 17/00 | |
| 2019/0367201 A1 * | 12/2019 | Jeschke | G01N 27/24 | |
| 2019/0373913 A1 * | 12/2019 | Velez | A23G 9/228 | |
| 2020/0375848 A1 * | 12/2020 | Gamberini | A61J 3/074 | |
| 2020/0408585 A1 * | 12/2020 | Wick | A61J 3/074 | |
| 2021/0097791 A1 * | 4/2021 | Wilkins | G07C 9/00309 | |
| 2021/0106500 A1 * | 4/2021 | Runft | A61J 3/074 | |
| 2021/0123861 A1 * | 4/2021 | Voisin | G01N 21/3563 | |
| 2021/0325235 A1 * | 10/2021 | Taveren | G01G 15/001 | |
| 2022/0218567 A1 * | 7/2022 | Singh | B65B 1/32 | |
| 2022/0228903 A1 * | 7/2022 | Masotti | A61J 3/074 | |
| 2023/0010297 A1 * | 1/2023 | Huhnen | B65B 1/04 | |

* cited by examiner

CAPSULE FILLING MACHINE AND METHOD FOR OPERATING A CAPSULE FILLING MACHINE

CROSS-REFERENCE TO RELATED APPLICATIONS

This application claims priority of European patent application no. 23177029.8, filed Jun. 2, 2023, the entire content of which is incorporated herein by reference.

BACKGROUND

Pharmaceutical products, products from the food supplement sector or the like are frequently administered as a unit dose in a two-piece capsule made of hard gelatin, for example. Such two-piece capsules are delivered in the empty state and filled with the desired content on capsule filling machines. For this purpose, use is made of capsule filling machines which widely take the form of carousel-type machines with a turntable. On the turntable are arranged so-called capsule segments which each have a plurality of capsule receptacles arranged in a row for a respective capsule. The turntable can be moved in a rotation plane in steps in such a way that the capsule segments sequentially run through different processing stations. Typical steps which are carried out at the individual processing stations are opening of the empty, initially still pre-closed capsules, filling and closing thereof, testing, ejection of unacceptable capsules and finally ejection of the capsules classified as acceptable.

In the case of critical filling products, in particular in the pharmaceutical sector, a central role is ascribed to the exact dosing of the active ingredient quantity in the capsules. In such cases, 100% weighing of the capsules is carried out. First of all, weighing the empty capsules is carried out in order to determine their tare weight. This is followed by the filling process, which in turn is followed by 100% weighing of the filled capsules (monitoring of the gross weight). The weight of the filling quantity is inferred from the difference between the gross and tare weight.

It has been shown that the above-described gross monitoring in particular does not sufficiently exactly cover the filling of small dosed quantities, since the weighing of small masses, in particular in relation to the capsule mass, is associated with some inaccuracy. Therefore, indirect monitoring systems are widely used in a supplementary capacity. These may be so-called advanced mass verification (AMV) systems in which the filling quantity entering the respective capsule is determined capacitively during the filling operation. In order to adjust such measuring systems, it is necessary to use precise sample comparison measurements with the actually determined value (determination of the dosed weight via a weigher). As in-process monitoring, such comparison measurements have to be repeated on the basis of sampling during the production. Such samples lead to a cost-relevant interruption of the regular production process. Another aggravating factor is that the weighing cell used has to be exactly adapted to the format of the capsule to be weighed, such that when there is a product change with a change of format, not only the capsule segments but also the weighing cell have to be adapted.

What has proved to be more complicated still is the filling quantity monitoring in the case of a multi-component filling of the individual capsules. Here, individual product components are separately filled sequentially into the respective capsules in different filling stations. A gross monitoring of the ready-filled capsules does not provide a reliable indication of the filled individual quantities. What is thus required is a gross monitoring of the individual quantities and, building thereon, an adjustment of the respective AMV systems in the different filling stations with corresponding downtimes of the regular production process.

Since it is also the case that the use of AMV systems or the like does not manage without monitoring via a weigher, the problem of determining small masses arises again here. In the prior art, the limited volume of the capsules to be weighed and the associated total mass of an individual capsule result in the fact that, in order to adjust the measuring system, a plurality of capsules are filled and weighed to form an average value as reference therefrom. The time required for such multiple weighing reduces the effective production time of the machine.

SUMMARY

It is an object of the disclosure to develop a capsule filling machine such that an exact filling quantity monitoring is possible with reduced influence on the regular filling operation.

This object is, for example, achieved by a capsule filling machine including: a turntable having a plurality of capsule receiver segments for receiving capsules to be filled; at least one insertion station for inserting empty capsules into the plurality of capsule receiver segments; at least one filling station for filling the capsules; the plurality of capsule receiver segments each having a segment lower part with capsule receptacles for capsule lower parts of the capsules; at least one test container for placing on the capsule receptacle of the segment lower part, wherein the at least one test container is for recurrent use in the capsule filling machine; and, a container weighing station with a weighing cell for weighing the at least one test container.

It is a further object of the disclosure to specify a method for operating such a capsule filling machine in which the filling quantity monitoring leads to reduced interruptions of the regular filling operation.

This object is achieved by a method for operating a capsule filling machine, wherein the capsule filling machine includes a turntable with capsule receiver segments for receiving capsules to be filled, at least one insertion station for inserting empty capsules into the plurality of capsule receiver segments, and at least one filling station for filling the capsules, wherein the capsule receiver segments each have a segment lower part with capsule receptacles for capsule lower parts of the capsules, wherein the capsule filling machine includes at least one test container, which is provided for recurrent use in the capsule filling machine, for placing on a capsule receptacle of the segment lower part, and wherein the capsule filling machine further includes a container weighing station with a weighing cell for weighing the at least one test container. The method includes: in a regular operating mode, inserting the capsule lower parts into the respective capsule receptacle of the segment lower part in the at least one insertion station, after which the capsule lower parts in the segment lower part are moved via the turntable to the at least one filling station and filled with a product at the at least one filling station; in a testing mode, placing the at least one test container on the capsule receptacle of the segment lower part, after which the at least one test container on the segment lower part is moved via the turntable to the at least one filling station and filled there with the product; and, moving a filled test container to the container weighing station and weighing the filled test container at the container weighing station via the weighing cell.

According to the disclosure, a capsule filling machine is provided which includes a turntable with capsule segments for receiving capsules to be filled, at least one insertion station for inserting empty capsules into the capsule segments, and at least one filling station for filling the capsules. The capsule segments each have a segment lower part with capsule receptacles for capsule lower parts of the capsules. The capsule filling machine includes at least one test container, which is provided for recurrent use in the capsule filling machine, for placing on a capsule receptacle of the segment lower part, and a container weighing station with a weighing cell for weighing the test container.

In a method according to the disclosure, in a regular operating mode, capsule lower parts are inserted into a respective capsule receptacle of a segment lower part in an insertion station, after which the capsule lower parts in the segment lower part are moved via the turntable to the at least one filling station and filled there with a product. In a testing mode, a test container is placed on a capsule receptacle of a segment lower part, after which the test container on the segment lower part is moved via the turntable to the at least one filling station and filled there with the product. The filled test container is moved to the container weighing station and weighed there via the weighing cell.

The alternative filling according to the disclosure of either capsule lower parts or of test containers allows a substantial separation of the testing mode from the regular operating mode in such a way that a testing operation carried out as required leads only to a minimum interruption of the regular production.

In particular, for this purpose, the filled test container is removed from the capsule receptacle of the segment lower part, after which the regular operating mode is already then resumed. Parallel thereto, the filled test container is then weighed via the weighing cell of the container weighing station during the continuous filling operation in the regular operating mode. This can occur with the required accuracy without the time expenditure required for this purpose leading to waiting times in the regular operating mode.

In an embodiment of the disclosure, the test container has an inner container volume which is a multiple of an inner capsule volume of a capsule lower part to be filled. In the corresponding method, the test container is filled at the at least one filling station with a multiple of the product quantity provided for a capsule filling. The test container filled in such a way is weighed via the weighing cell of the container weighing station. An average mass of an individual actually dosed product quantity is determined from the weighed mass and the chosen multiple of the provided product quantity. In this way, even small individual masses can be determined with a high degree of accuracy, since a weighing of the considerably higher total mass is possible in a technically simpler and more reliable manner and in addition leads to clearer differences with respect to the disturbing mass of the capsules concomitantly weighed according to the prior art.

It may be expedient to provide only an individual test container or a limited number thereof. Preferably, the capsule filling machine is configured to insert a respective test container into a plurality of capsule receptacles and in particular into all the capsule receptacles of an individual segment lower part. This allows the filling at all filling places of a filling station in a single pass without this filling station having to be approached multiple times. The time expenditure is correspondingly low.

The container weighing station is expediently configured for the sequential weighing of individual test containers. Very exact individual results can be achieved in this way. As a result of the separation of testing and operating mode already mentioned above, the required time expenditure is without disadvantage.

Various possibilities come into consideration for the mechanical configuration of the container weighing station. Advantageously, the container weighing station has a transport head which is mounted so as to be pivotable about a vertical pivot axis, wherein at least one telescopic arm with a gripper for a test container is guided radially with respect to the pivot axis in the transport head, and wherein a pivoting travel of the transport head and a linear travel of the telescopic arm are tailored to one another in such a way that the gripper can be moved into the region of a capsule receptacle and into the region of the weighing cell. Good positioning accuracy with a high degree of operational reliability is achieved with a simple mechanical construction.

In a preferred configuration, the container weighing station includes a cleaning device for the test container. Here, the weighed test quantities of the product can be reliably removed such that clean test containers without residual quantities of the product are available for subsequent test operations.

It may be sufficient for the device according to the disclosure and the method according to the disclosure to be used for a sample monitoring of the product quantities dosed in the regular operating mode without, for example, a 100% monitoring being carried out. Advantageously, the at least one filling station is provided with an indirect mass measuring system for determining the output product mass, wherein a calibration or readjustment of the indirect mass measuring system is then carried out by weighing the filled test container via the weighing cell of the container weighing station. In this way, a 100% in-process monitoring can be realized over a long production time period with only short interruption times of the regular operating mode.

BRIEF DESCRIPTION OF DRAWINGS

The invention will now be described with reference to the drawings wherein.

DETAILED DESCRIPTION

Figure 1:
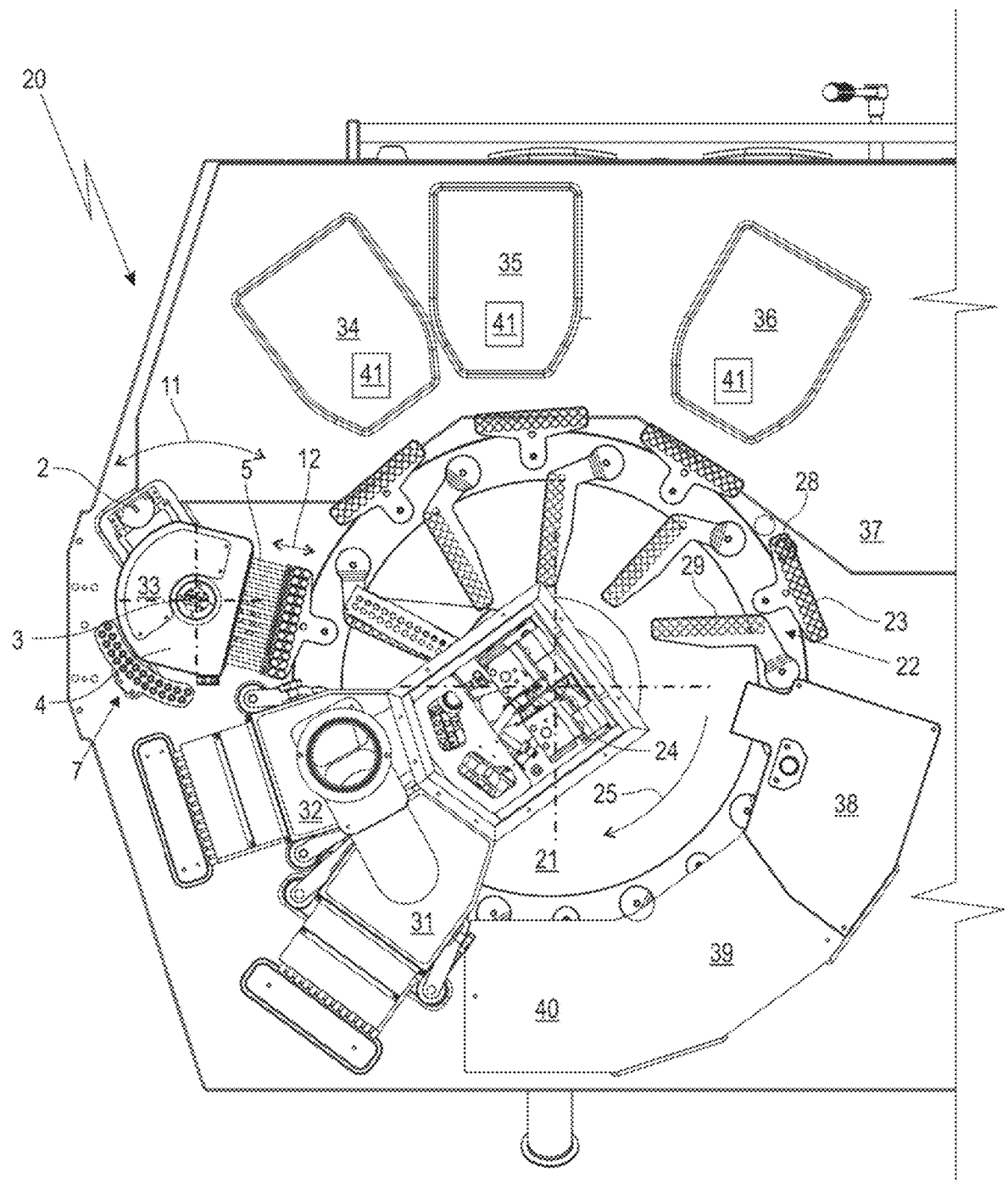
FIG. 1 is a schematic plan view showing a capsule filling machine in a configuration according to the disclosure with turntable, with capsule segments on the turntable, and with a container weighing station for weighing test containers.
Figure 4:
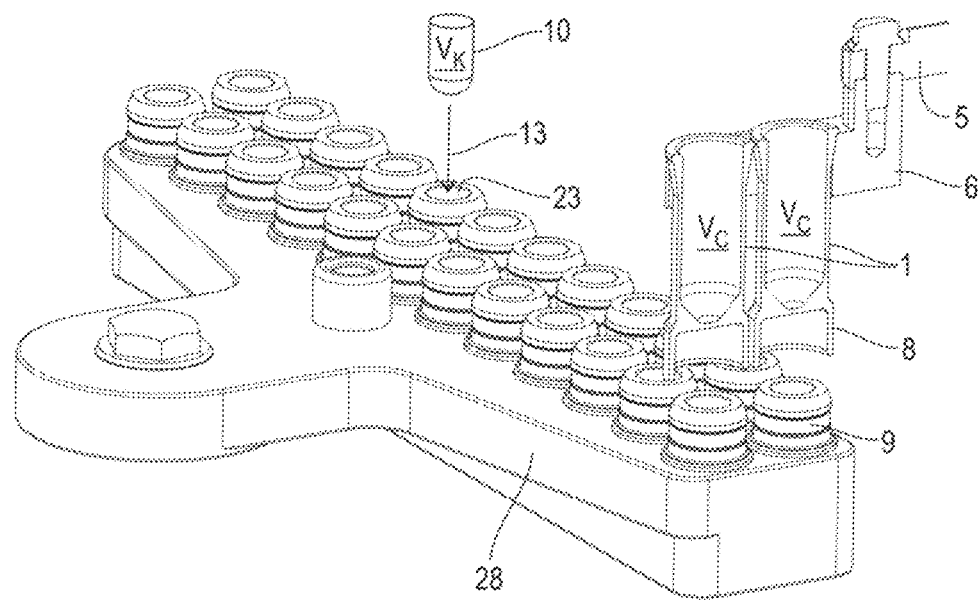
FIG. 4 is an enlarged detail illustration showing the segment lower part according to FIG. 3 with test containers positioned above it.

FIG. 1 is a plan view showing the central part of a capsule filling machine 20 configured according to the disclosure for filling capsules with a filling material. The filling material can be provided in the form of a powder, granules, tablets or the like. It may be a pharmaceutical preparation, a food supplement or the like. The capsules are configured in a customary configuration and consist of a capsule lower part 10, which is illustrated in FIG. 4, and of a capsule upper part (not shown) plugged thereon, both of which are produced from hard gelatin, for example.

The capsule filling machine 20 according to FIG. 1 includes a turntable 21 which can be driven to rotate in clocked steps about a vertical axis of rotation 24 corresponding to an arrow 25. A number of capsule segments 22 (also referred to as capsule receiver segments 22) are arranged on a circumferential region of the turntable 21 at uniform angular spacings. In the embodiment shown, a total of ten capsule segments 22 are provided. However, another number may also be expedient.

It is clear from FIG. 1 that each capsule segment 22 consists of a respective segment lower part 28, which is firmly fastened to the circumferential region of the turntable 21, and of a segment upper part 29 which is pivotable relative thereto. In the embodiment shown, the segment lower parts 28 contain a number of capsule receptacles 23 for receiving a respective capsule lower part 10 (FIG. 4), wherein the capsule receptacles 23 are each arranged in at least one linear straight-line row. In the present case, each segment lower part 28 has two rows of in each case twelve capsule receptacles 23, that is, a total of twenty-four capsule receptacles 23, but a different number may also be expedient. The segment upper parts 29 are correspondingly provided with a corresponding number of receptacles for the capsule upper parts.

Around the turntable 21 are positioned a plurality of processing stations 31 to 40 which are stationary, that is, do not co-rotate with the turntable 21, these stations being illustrated partially only schematically and not in detail. The number and position of the processing stations 31 to 40 corresponds to the number of the capsule segments 22. In the present case, a total of ten processing stations 31 to 40 are thus provided such that, in each rotary position, which is clocked in angular steps, of the turntable 21, each capsule segment 22 comes to lie in the access region of a respective one of the processing stations 31 to 40.

According to the embodiment shown, in a regular operating mode, beginning with the first two processing stations, namely at insertion stations 31, 32, first of all provisionally plugged-together empty capsules each consisting of a capsule lower part 10 (FIG. 4) and a capsule upper part are inserted into the row of capsule receptacles 23, with a separation of the plugged-on capsule upper parts from the capsule lower parts 10 then also occurring. The insertion of the empty capsules into the radially inner receiving row of the capsule segment 22 occurs in the first insertion station 31, whereupon the insertion of the empty capsules into the radially outer row follows in the second processing station 32.

The next processing station is a station with dual function. On the one hand, unopened empty capsules are separated out there. On the other hand, a container weighing station 33 is situated there, the function of which will be described in more detail further below. During the transition from the second insertion and separating station 32 to the container weighing station 33, the segment upper part 29 with the capsule upper parts held therein is pivoted with respect to the segment lower part 28 such that the segment lower part 28 with the capsule lower parts 10 held therein is freely accessible from above. In this state, any present unopened empty capsules are situated in the pivoted-up segment upper part 29 and are ejected and removed at this point.

The container weighing station 33 is followed here by a total of three processing stations in the form of filling stations 34, 35, 36 in which the capsule lower parts 10 held in the segment lower parts 28 are filled sequentially with different proportions of the provided filling material for the purpose of a multi-component filling. It may also be sufficient to provide only one or two filling stations. Each filling station has a dedicated indirect mass measuring system, which is known from the prior art and only schematically indicated here. In the present case, the indirect mass measuring system is an advanced mass verification (AMV) system in which the dosed product quantity falls through a capacitive measuring section into the target container (capsule lower part 10 or test container 1) and in so doing generates a capacitive measuring signal. With correct adjustment and calibration, the capacitive measuring signal delivers a very exact mass determination even of very small filling quantities.

After passing through the last filling station 36, according to the regular operating mode, pivoting of the segment upper part 29 back into the aligned position relative to the segment lower part 28 occurs in a pivoting-in station 37. In the following closing station 38, the capsules are closed in that the capsule upper parts pulled off or separated beforehand are pushed back onto the filled capsule lower parts 10 and latched. The closing station 38 is adjoined by a monitoring station 39. Tested capsules found to be unacceptable are ejected in the monitoring station 39. In a following, last station, namely in the ejection station 40, the remaining capsules found to be acceptable are ejected and passed for further process steps such as cleaning and packaging.

The plan view according to FIG. 1 also shows first details of the container weighing station 33. Accordingly, the container weighing station 33 includes a weighing cell 2 for weighing test containers 1, which are described in more detail further below in conjunction with FIGS. 2 to 9, and a transport head 4 which can be driven and is mounted so as to be pivotable about a vertical pivot axis 3 corresponding to a double arrow 11. In or on the transport head 4, at least one telescopic arm 5, here a plurality of telescopic arms 5, is or are guided and can be driven approximately radially with respect to the pivot axis 3 corresponding to a double arrow 12. At their free ends, the telescopic arms 5 are each provided with a gripper 6 (FIGS. 4 and 5) for at least one test container 1, here for in each case two test containers 1. A pivoting travel of the transport head 4 and a linear travel of the telescopic arms 5 are tailored to one another in such a way that all the grippers 6 can be moved both into the region of an associated capsule receptacle 23 of the segment lower part 28 situated at the container weighing station 33 and into the region of the weighing cell 2. Moreover, it can also be seen that the container weighing station 33 has a cleaning device 7 whose function is described in more detail further below in conjunction with FIG. 9.

Figure 2:
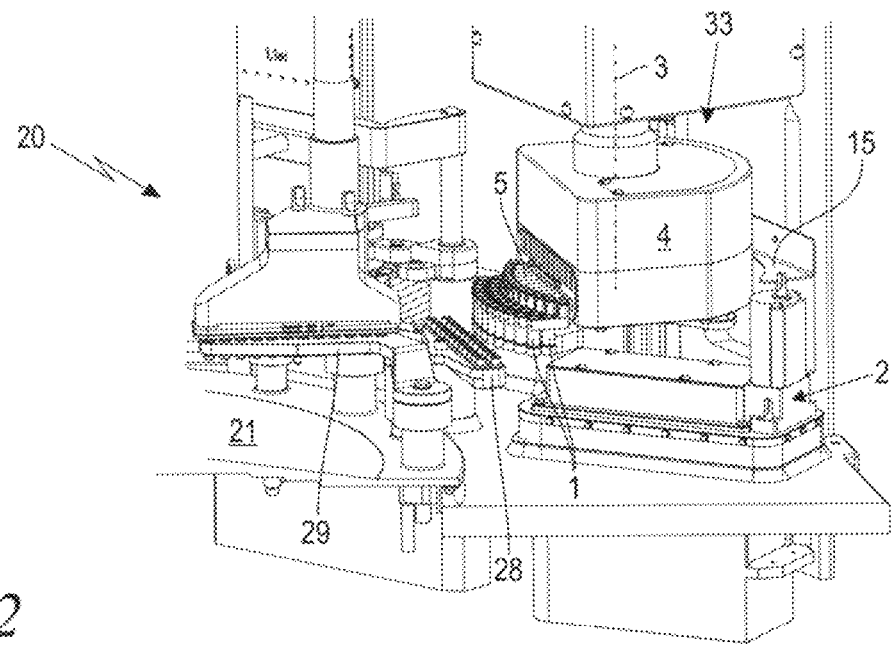
FIG. 2 is a perspective view showing the container weighing station of the capsule filling machine according to FIG. 1 with test containers in the rest position during the regular operating mode.

FIG. 2 is a perspective view showing the capsule filling machine 20 according to FIG. 1 in the region of the container weighing station 33 during the regular operating mode described above in conjunction with FIG. 1. On its rear side facing away from the turntable 21, the container weighing station 33 has a cover 15 below which the test containers 1 are stored protected or parked (not shown) during the regular operating mode. In the present method step, a segment lower part 28 is halted in the intake region of the container weighing station 33 while the associated segment upper part 29 situated above it in the vertical direction is pivoted away therefrom. In preparation for the now following testing mode, the test containers 1 have been retrieved from the above-described parked position via the transport head 4. The transport head 4 is now in a pivoting position in which the telescopic arms 5 with the test containers 1 held at their ends face in the direction of the adjoining segment lower part 28. The telescopic arms 5 are retracted to such an extent that the test containers 1 held thereon are situated on circular paths around the pivot axis 3 which lead into the intake region of the weighing cell 2 and of the cleaning device 7 without, however, covering the adjoining segment lower part 28 or interfering with it in some other way during the regular operating mode. In other words, the test containers 1 at this point are in a standby position during the regular operating mode until they are used in a testing mode described further below. The parked test containers 1 have previously been weighed in the empty state via the weighing station in order to determine a respective tare weight for each test container 1.

Figure 3:
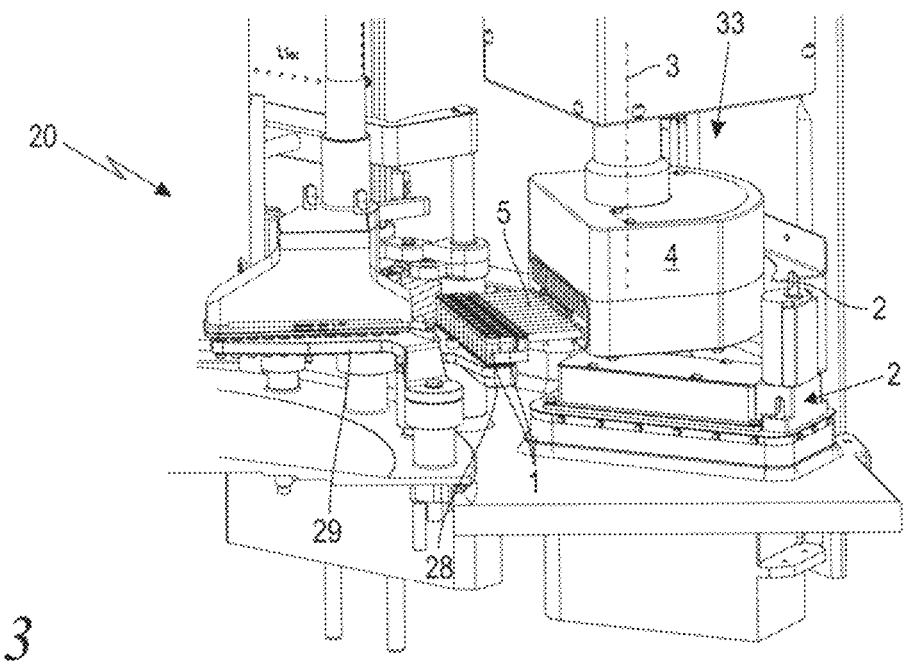
FIG. 3 shows the arrangement according to FIG. 2 at the beginning of a testing mode when depositing the test containers on a segment lower part of a capsule segment.

FIG. 3 shows the arrangement according to FIG. 2 at the beginning of the testing mode now taking place in which the above-described regular operating mode is temporarily interrupted. In this testing mode, the telescopic arms 5 are extended with respect to the transport head 4 to such an extent that the test containers 1 held at their ends are positioned above a respective capsule receptacle 23 of the segment lower part 28 and lowered onto it.

FIG. 4 is an enlarged detail illustration showing the segment lower part 28 according to FIG. 3 with the test containers 1 positioned above it. For the sake of better clarity, there is shown here, in a longitudinal section, only the free end of an individual telescopic arm 5 with a gripper 6 and with a pair of test containers 1 held in the gripper 6. A combination with FIG. 3 reveals that, in the embodiment shown, a respective test container 1 is in fact provided for each individual capsule receptacle 23 of an individual segment lower part 28. The number of telescopic arms 5 and grippers 6 corresponds to the number of capsule receptacles 23 within a linear row, whereby, in the embodiment shown, twelve telescopic arms 5 and twelve grippers 6 are thus provided. Each gripper is configured to simultaneously grip a number of test containers 1 which corresponds to the number of the linear rows of capsule receptacles 23 of the segment lower part 28. In the present case, each gripper 6 is thus configured for gripping two test containers 1, with the result that a total of twenty-four test containers 1 are present and can be handled corresponding to the twenty-four capsule receptacles 23 of an individual segment lower part 28. However, in the context of the disclosure, it may also be expedient not to provide a respective test container 1 for each capsule receptacle. Thus, for example, it is conceivable to provide a smaller number of test containers 1 or even only one individual test container 1 and thus then to take all capsule receptacles 23 or only a selection thereof into consideration sequentially.

According to the sectional illustration shown in FIG. 4, the test containers 1 have an only upwardly open and otherwise closed interior with a container volume $V_C$. Below this, the test containers 1 are provided with a positioning collar 8 with which they can be deposited on projections 9 of the capsule receptacles 23 and positioned centered.

For comparison with the test containers 1, there is schematically illustrated an individual capsule lower part 10, with a respective one of the capsule lower parts being inserted during the regular operation from above into a respective capsule receptacle 23 corresponding to an arrow 13. Just like the test containers 1, the capsule lower parts 10 each have an only upwardly open interior, with such an interior here having a capsule volume $V_K$. The inner container volume $V_C$ of the test container 1 is a multiple of the inner capsule volume $V_K$ of an individual capsule lower part 10, with the result that an individual test container can hold a plurality of individual quantities of the product provided for filling an individual capsule lower part 10. The multiple of the inner capsule volume $V_K$ is at least double, preferably five to twenty times, and in particular eight to fifteen times, the inner capsule volume $V_K$. Accordingly, during operation, at least two, preferably five to twenty, and in particular eight to fifteen, individual quantities of the product provided for filling an individual capsule lower part 10 are advantageously filled into an individual test container 1, whereupon the test containers 1 filled in such a way are then weighed in the manner described below.

Figure 5:
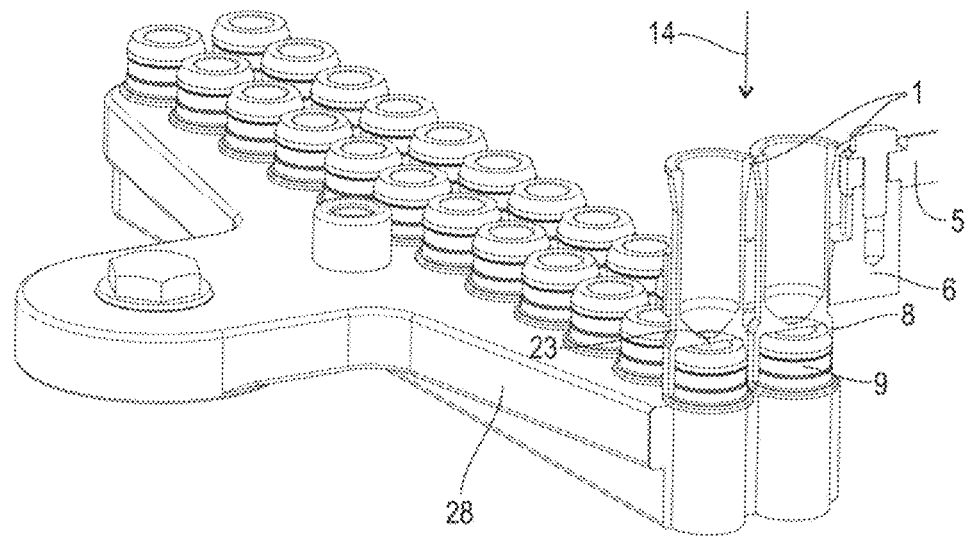
FIG. 5 shows the arrangement according to FIG. 4 with test containers deposited on the segment lower part.

FIG. 5 shows the arrangement according to FIG. 4 with test containers 1 deposited on the segment lower part 28 in the testing mode, which corresponds to the state according to FIG. 3. For this purpose, the transport head 4 (FIG. 3) with the telescopic arms 5 has been lowered downwards corresponding to an arrow 14, as a result of which the test containers 1 have been lowered onto the segment lower part 28. It can be seen that the test containers 1 enclose the projection 9 of the associated capsule receptacle 23 by way of their respective positioning collar 8 such that, in the testing mode, the test containers 1, with respect to the horizontal position, are oriented or centered in the same position as the capsule lower parts 10 in the regular operating mode.

Starting from here, the segment lower part 28 equipped in such a way with test containers 1 is moved via the turntable 21 to the at least one filling station, here to the first filling station 34, where corresponding product quantities are then filled not into capsule lower parts 10, but instead into the test containers 1. It may be sufficient to fill in only the individual quantity of the respective product provided for filling a capsule lower part 10. However, in the present embodiment, a plurality of the individual quantities provided for filling a capsule lower part 10, that is, a plurality thereof, are filled into a respective test container 1. The number of the individual quantities and the associated measuring signals of the indirect mass measuring system 41 are logged or stored and remain ready for retrieval for subsequent evaluation.

In the further course of the testing mode, the turntable 21 is rotated back counter to the arrow 25 according to FIG. 1 to such an extent that the segment lower part 28 with the filled test containers 1 is positioned again in the intake region of the container weighing station 33. This is illustrated in FIG. 6, in which the test containers 1 have been gripped again by the grippers 6 of the telescopic arms 5

(FIGS. 4 and 5) and lifted from the segment lower part 28 corresponding to an arrow 14.

Figure 6:
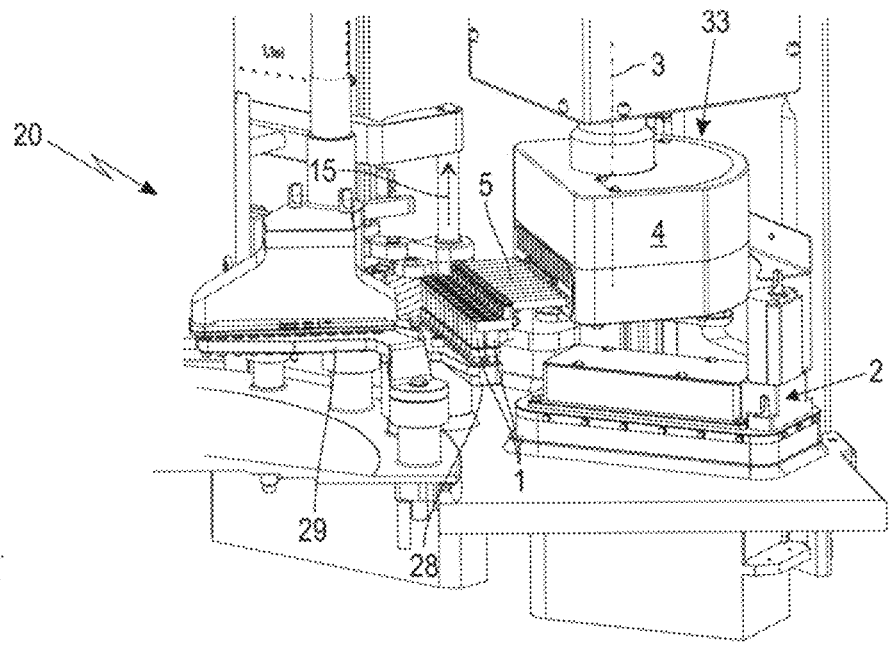
FIG. 6 shows the arrangement according to FIGS. 2 and 3 with filled test containers moved back to the container weighing station.
Figure 7:
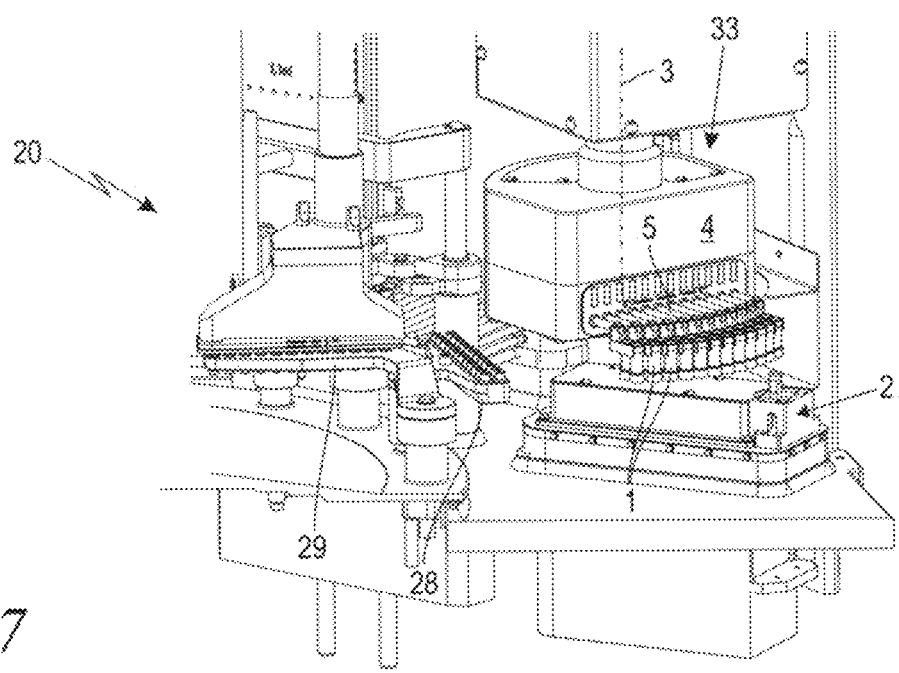
FIG. 7 shows the arrangement according to FIG. 6 with test containers lifted from the capsule segment and brought to a weighing cell.

The next method step can be seen from the illustration according to FIG. 7, in which, starting from FIG. 6, the test containers 1 have been brought into the region of the weighing cell 1 as a result of a pivoting movement of the transport head 4. The telescopic arms 5 are retracted again to such an extent that the test containers 1 held at their free ends are situated on the circular paths, which have already been described further above in conjunction with FIG. 2, around the pivot axis 3.

As soon as the test containers 1 have been pivoted away via the transport head 4 out of the intake region of the adjoining segment lower part 28 corresponding to the illustration according to FIG. 7, the regular operating mode with the filling of empty capsules as described above in conjunction with FIG. 1 can be resumed. The weighing and calibrating operation described below can be carried out in parallel to the regular operating mode.

Figure 8:
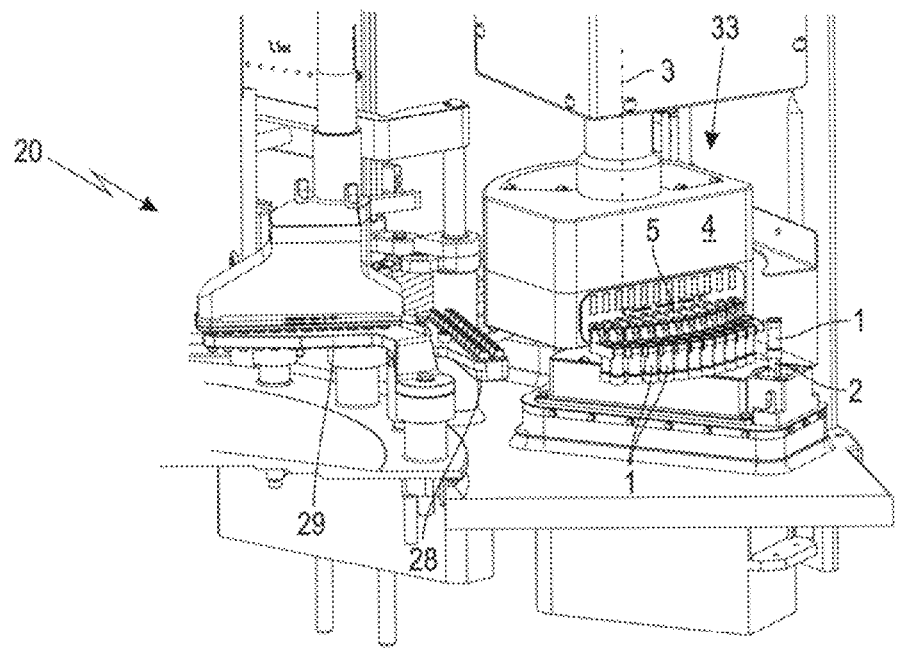
FIG. 8 shows the arrangement according to FIG. 7 with a weighing container deposited on the weighing cell; and, FIG. 9 is a rear perspective view showing the arrangement according to FIG. 8 with test containers brought to a cleaning device.

The filled test containers 1 brought out of the intake region of the adjoining segment lower part 28 are now weighed via the weighing cell 2. For this purpose, in the embodiment shown, the container weighing station 33 is configured for the sequential weighing of individual test containers 1. In the present case, this is achieved in that the test containers 1 are successively individually deposited on the weighing cell 2 and individually weighed by a coordinated pivoting movement of the transport head and a coordinated linear movement of the telescopic arms 5, as can be seen in FIG. 8. In this way, a gross weight of each individual filled test container 1 is determined. Forming the difference with the previously determined tare weight already mentioned further above gives the weight determination of the respective filling quantity within each test container 1. The total weight of the filling determined in such a way is now divided by the logged number of the filled-in individual quantities, resulting in an average mass of the individual product quantities actually dosed in the first filling station 34. From this and from the likewise logged corresponding measuring signals, a calibration or readjustment of the indirect mass measuring system 41 of the first filling station 34 is then performed, which in particular can be carried out within the context of an in-process monitoring during the running regular operating mode. In an analogous manner, a calibration or readjustment of the indirect mass measuring system 41 also of the further filling stations 35, 36 can then also be carried out in succession. For this purpose, the test containers 1 can be emptied beforehand and then refilled. However, it may also be expedient to leave the filling quantity from the preceding test weighing in the test container 1, in which case the previously determined total weight is used as tare weight of the current test weighing.

As already mentioned, it may be sufficient according to the disclosure for only a single individual quantity provided for filling a capsule lower part 10 to be filled into the test container 1 at the respective filling station 34, 35, 36 and for its mass to be determined via the weighing cell 2 in the above-described manner. However, by filling in a multiple thereof and subsequently forming the average value, the total mass is increased even with very small individual filling quantities to such an extent that more reliable weighing with more exact average value determination is possible.

In a further variant, it may be expedient first of all to carry out fillings at all filling stations 34, 35, 36 and only then to carry out a weighing. In addition, the disclosure can also be used without the context of an indirect mass measuring system 41 in that the above-described weighing is used as a simple sample monitoring for actually dosed filling quantities.

Figure 9:
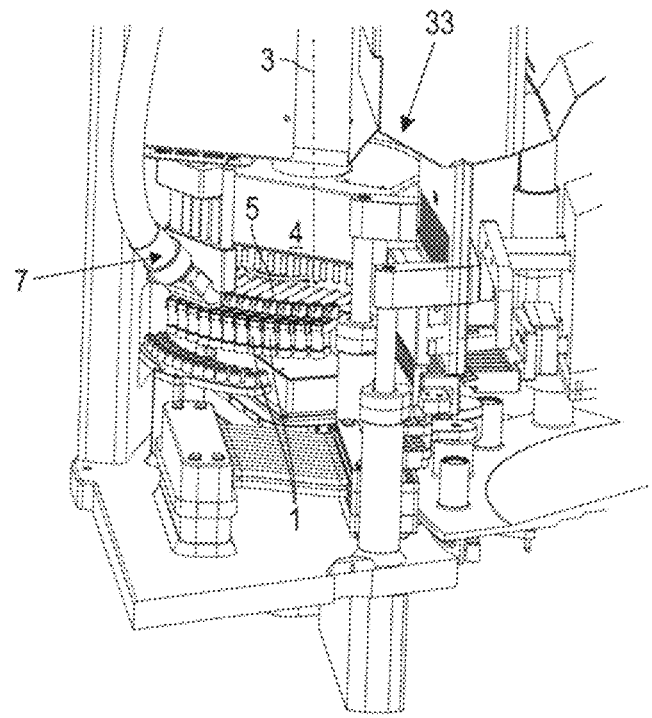

FIG. 9 is a rear perspective view showing the arrangement according to FIG. 8, wherein the container weighing station 33 is provided in this region with a cleaning device 7. After the weighing according to FIG. 8, the transport head 4 has been further rotated to such an extent that the test containers are held thereon in the active region of the cleaning device 7. At this location, the filling quantities are blown out with compressed air and simultaneously extracted with suction such that empty test containers are available for re-taring and for further weighing operations.

In the regular operating mode, empty capsules are, as described above, fed to the capsule filling machine 20 from outside and removed from the capsule filling machine 20 in the filled state. By contrast thereto, the test containers 1 are part of the capsule filling machine 20. They are used recurrently in a circuit and, in the embodiment shown, remain in the capsule filling machine 20 as part thereof.

It is understood that the foregoing description is that of the preferred embodiments of the invention and that various changes and modifications may be made thereto without departing from the spirit and scope of the invention as defined in the appended claims.

The invention claimed is:

1. A capsule filling machine comprising:
a turntable having a plurality of capsule receiver segments for receiving capsules to be filled;
at least one insertion station for inserting empty capsules into the plurality of capsule receiver segments;
at least one filling station for filling the capsules;
said plurality of capsule receiver segments each having a segment lower part with capsule receptacles for capsule lower parts of the capsules;
at least one test container for placing on the capsule receptacle of the segment lower part, wherein said at least one test container is for recurrent use in the capsule filling machine;
a container weighing station with a weighing cell for weighing said at least one test container; and,
wherein said at least one test container has an inner container volume which is a multiple of an inner capsule volume of the capsule lower part to be filled, the multiple of the inner capsule volume being at least double.

2. The capsule filling machine of claim 1, wherein the capsule filling machine is configured for a respective test container to be inserted into a plurality of the capsule receptacles of one of said segment lower parts.

3. The capsule filling machine of claim 1, wherein the capsule filling machine is configured to have a respective test container inserted into all the capsule receptacles of one of said segment lower parts.

4. The capsule filling machine of claim 1, wherein said container weighing station includes a cleaning device for said at least one test container.

5. A capsule filling machine comprising:
a turntable having a plurality of capsule receiver segments for receiving capsules to be filled;
at least one insertion station for inserting empty capsules into the plurality of capsule receiver segments;
at least one filling station for filling the capsules;
said plurality of capsule receiver segments each having a segment lower part with capsule receptacles for capsule lower parts of the capsules;

a plurality of test containers for placing on the capsule receptacle of the segment lower part, wherein said plurality of test containers is for recurrent use in the capsule filling machine;

a container weighing station with a weighing cell for weighing said plurality of test containers; and, wherein said container weighing station is configured to sequentially weigh individual ones of said plurality of test containers.

6. A capsule filling machine comprising:

a turntable having a plurality of capsule receiver segments for receiving capsules to be filled;

at least one insertion station for inserting empty capsules into the plurality of capsule receiver segments;

at least one filling station for filling the capsules;

said plurality of capsule receiver segments each having a segment lower part with capsule receptacles for capsule lower parts of the capsules;

at least one test container for placing on the capsule receptacle of the segment lower part, wherein said at least one test container is for recurrent use in the capsule filling machine;

a container weighing station with a weighing cell for weighing said at least one test container;

wherein said container weighing station has a transport head which is mounted so as to be pivotable about a vertical pivot axis;

at least one telescopic arm with a gripper for said at least one test container is guided radially with respect to the vertical pivot axis in said transport head; and, a pivoting travel of the transport head and a linear travel of the at least one telescopic arm are mutually tailored such that said gripper is movable into a region of one of said capsule receptacles and into a region of said weighing cell.

7. A method for operating a capsule filling machine, wherein the capsule filling machine includes a turntable with capsule receiver segments for receiving capsules to be filled, at least one insertion station for inserting empty capsules into the plurality of capsule receiver segments, and at least one filling station for filling the capsules, wherein the capsule receiver segments each have a segment lower part with capsule receptacles for capsule lower parts of the capsules, wherein the capsule filling machine includes at least one test container, which is provided for recurrent use in the capsule filling machine, for placing on a capsule receptacle of the segment lower part, and wherein the capsule filling machine further includes a container weighing station with a weighing cell for weighing the at least one test container, the method comprising:

in a regular operating mode, inserting the capsule lower parts into the respective capsule receptacle of the segment lower part in the at least one insertion station, after which the capsule lower parts in the segment lower part are moved via the turntable to the at least one filling station and filled with a product at the at least one filling station;

in a testing mode, placing the at least one test container on the capsule receptacle of the segment lower part, after which the at least one test container on the segment lower part is moved via the turntable to the at least one filling station and filled there with a multiple of a product quantity provided for the capsule filling, the multiple of the product quantity provided for the capsule filling being at least double; and, moving a filled test container to the container weighing station and weighing the filled test container at the container weighing station via the weighing cell of the container weighing station and an average mass of an individual actually dosed product quantity is determined via the weighing cell.

8. The method of claim 7, wherein the at least one filling station has an indirect mass measuring system for determining an output product mass; and, a calibration of the indirect mass measuring system is carried out by weighing the filled test container via the weighing cell of the container weighing station.

9. The method of claim 7 further comprising:

removing the filled test container from the capsule receptacle of the segment lower part;

resuming a regular operating mode; and, wherein the filled test container is weighed via the weighing cell of the container weighing station during a continuous filling operation in the regular operating mode.

* * * * *